United States Patent
Heinrich et al.

(10) Patent No.: US 7,562,565 B2
(45) Date of Patent: Jul. 21, 2009

(54) PROCEDURE AND CONTROL UNIT TO DIAGNOSE A SECONDARY AIR SYSTEM

(75) Inventors: Detlef Heinrich, Ludwigsburg (DE); Dierk Rommel, Elchesheim (DE); Martin Schaeffler, Untergruppenbach-Unterheinriet (DE); Andreas Beer, Braunschweig (DE)

(73) Assignee: Robert Bosch GmbH, Stuttgart (DE)

( * ) Notice: Subject to any disclaimer, the term of this patent is extended or adjusted under 35 U.S.C. 154(b) by 90 days.

(21) Appl. No.: 11/800,259

(22) Filed: May 4, 2007

(65) Prior Publication Data

US 2008/0016954 A1  Jan. 24, 2008

(30) Foreign Application Priority Data

May 4, 2006  (DE) ........................ 10 2006 021 964

(51) Int. Cl.
*G01M 15/04* (2006.01)
(52) U.S. Cl. .................................. 73/114.69; 73/114.37
(58) Field of Classification Search .............. 73/114.31, 73/114.32, 114.33, 114.37, 114.69, 114.74, 73/114.75, 114.76
See application file for complete search history.

(56) References Cited

U.S. PATENT DOCUMENTS 5,542,292 A * 8/1996 Schneider et al. ........ 73/114.69
6,131,447 A * 10/2000 Oeller ...................... 73/114.32
2005/0016265 A1* 1/2005 Streib ........................ 73/118.1
2005/0150209 A1* 7/2005 Kesch et al. ................. 60/277
2008/0202223 A1* 8/2008 Tsujimura et al. ......... 73/114.31

FOREIGN PATENT DOCUMENTS

EP  1 293 648  3/2003

* cited by examiner

*Primary Examiner*—Eric S McCall
(74) *Attorney, Agent, or Firm*—Merchant & Gould P.C.

(57) ABSTRACT

A procedure is introduced to test the functional capability of a secondary air system of an internal combustion engine, wherein values of a pressure are acquired, which arises in the secondary air system between the secondary air pump and a secondary air flow cross section, which can be controlled, when the secondary air pump is activated and the actuation of the secondary air flow cross section is increased; in that a measurement for the pressure is developed from the acquired values and is compared with a set point value, and the functional capability of the secondary air system is assessed as a function of a result of the comparison. The procedure characterizes itself in such a way, that in a secondary air system, whose secondary air flow cross section is controlled by two secondary air valves, wherein one of the two secondary air valves is actuated to close, while the other one of the two secondary air valves is actuated to open, and the assessment of the functional capability for a section of the secondary air system occurs in the section, in which the secondary air valve actuated to open is disposed. In addition a control unit is introduced, which controls the sequence of such a procedure.

10 Claims, 2 Drawing Sheets

PROCEDURE AND CONTROL UNIT TO DIAGNOSE A SECONDARY AIR SYSTEM

BACKGROUND

During the majority of known diagnostic procedures, the diagnosis of the secondary air system does not take place, however, on the basis of acquired pressures, but on the basis of signals of a lambda sensor in the exhaust gas, which allows a calculation of the secondary air mass in the exhaust gas system. The disadvantage of this diagnostic possibility is, however, that a diagnosis after a cold start can only then be implemented if the lambda sensor has achieved its operational readiness, which is set at a certain operating temperature. The operational readiness especially in the case of turbocharged engines is achieved relatively late, because the lambda sensor is disposed as a rule in relatively cool exhaust gas behind the turbo charger. An additional disadvantage is that the mixing of the secondary air mass is dependent on the exhaust gas mass as well as on errors in the fuel metering, which result in an open loop control when the lambda sensor is not yet operationally ready. Moreover, future government standards (for example from the model year 2008 forward for California, USA) will allow a diagnosis affecting the exhaust gas to take place only during cold starting. This is especially critical for internal combustion engines with exhaust gas turbo chargers, because the operational readiness of the lambda sensor is under certain circumstances first achieved when a diagnosis is already no longer allowed.

Internal combustion engines with multiple groups of cylinders, for example V-engines with two banks of cylinders, have exhaust gas systems with sections, which carry the exhaust gas of the cylinder groups separated from each other. The secondary air is in the process fed into the separate sections, which requires secondary air feeds with separate secondary air valves. Due to government standards, errors in the separate secondary air feeds must be recognized as such and assigned to the affected secondary air feed.

Against this background the task of the invention lies in the designation of a procedure and a control unit, with which system errors in separate secondary air feeds are recognized and assigned to their respective feeds with the least possible outlay of hardware. The procedure should also especially be able to be implemented on turbocharged engines.

SUMMARY

The invention concerns a procedure according to the preamble of claim 1 and a control unit according to the preamble of the independent apparatus claim. Such a procedure and such a control unit are in each case known from the patent EP 1 293 648 A2. A secondary air system serves the purpose of introducing oxygen into the exhaust gas system of an internal combustion engine after circumvention of its combustion chambers. The oxygen introduced by the secondary air system serves the purpose of oxidizing when necessary exhaust gas components present in the exhaust gas, like carbon monoxide or non-combusted hydrocarbons. Such oxidation reactions take place exothermally and can, therefore, serve to rapidly heat up the exhaust gas and emission control components, such as catalytic converters after cold starting. A malfunction of the secondary air system can for that reason negatively affect the exhaust gas emissions; and, therefore, on account of government standards must be recognized by On Board technology.

The document mentioned at the beginning of the application discloses in this context a diagnosis of a secondary air system with a secondary air pump, a secondary air valve and a pressure sensor, which in a first embodiment is disposed upstream from the secondary air valve and in a second embodiment downstream from the secondary air valve. In an embodiment with an absolute pressure sensor as a pressure sensor, the absolute pressure is acquired immediately before starting the internal combustion engine. Thereby on the one hand, a relative pressure could be obtained at the time of the implementation of the diagnostic program, while the pressure sensor used could be employed as an absolute pressure sensor when the secondary air supply is stopped. A control unit determines a pattern of a pressure behavior (pressure behavior pattern). Depending on the activity of the secondary air pump and whether the secondary air valve is open, four pressure behaviors to be expected are distinguishable. A first pressure behavior characterizes itself in such a way that its average value as well as its amplitudes exceed in each case assigned threshold values and are expected when the secondary air pump is running and the secondary air valve is open. In a second pressure behavior the average value is smaller than zero and the amplitudes are small, as is expected when the secondary air pump is not running and the secondary air valve is open. In a third pressure behavior, which is to be expected when the secondary air valve is closed and the secondary air pump is running, a large average value occurs, however, amplitudes do not occur; and in a fourth pressure behavior the average value is practically zero and no amplitudes occur. The average values and amplitudes, which have been determined, are assigned to one of the expected behaviors by means of threshold value comparisons.

The assigning takes place once during an actuation of the pump and valve, in which a secondary air supply results (supply control) when everything is in good working order and once during an actuation, in which a secondary air supply is not suppose to result when every thing is in good working order (stop control). By comparing the patterns occurring with the patterns to be expected, a defective continuously working secondary air pump, a defective inoperative secondary air pump, a defective open secondary air valve and a defective closed secondary air valve are recognized. If the fourth pattern occurs during the supply control phase, this indicates already conclusively the presence of a defective, inoperative secondary air pump and a defective, closed secondary air valve. The determination of the pressure behaviors in the stop control phase could then be omitted. In an embodiment, the secondary air guidance is additionally checked for soiling or clogging. At the same time the pressure is checked when the pump is running with both the secondary air valve open and closed.

This task is solved with a procedure and control unit of the kind mentioned at the beginning of the application by means of the distinguishing characteristics of the independent claim associated in each case.

Subsequently the check of the functional capability takes place in a secondary air system, whose secondary air flow cross section can be controlled by two secondary air valves in such a manner that one of the two secondary air valves is actuated to close, while the other of the two secondary air valves is actuated to open. The assessment of the functional capability is carried out for a section of the secondary air system, in which the secondary air valve actuated to open is disposed. The actuation of both of the secondary air valves can subsequently be interchanged, so that the secondary air valve previously actuated to close is now actuated to open, and the secondary air valve previously actuated to open is now actuated to close.

This alternating actuation of both secondary air valves allows for an individual check of the aforementioned sections and thereby for a pinpointing of the errors with only one single pressure sensor. This pinpointing is also feasible in the turbocharged motor and produces reliable results.

Additional advantages result from the description and the attached figures.

It goes without saying that the previously mentioned characteristics and those subsequently to be explained are not only to be used in the combination denoted in each case but also in other combinations or individually without departing from the scope of the invention at hand.

BRIEF DESCRIPTION OF THE DRAWINGS

Examples of embodiment of the invention are depicted in the drawings and will be explained in detail in the following description. The following are depicted in each case in schematic form.

DETAILED DESCRIPTION

Figure 1:
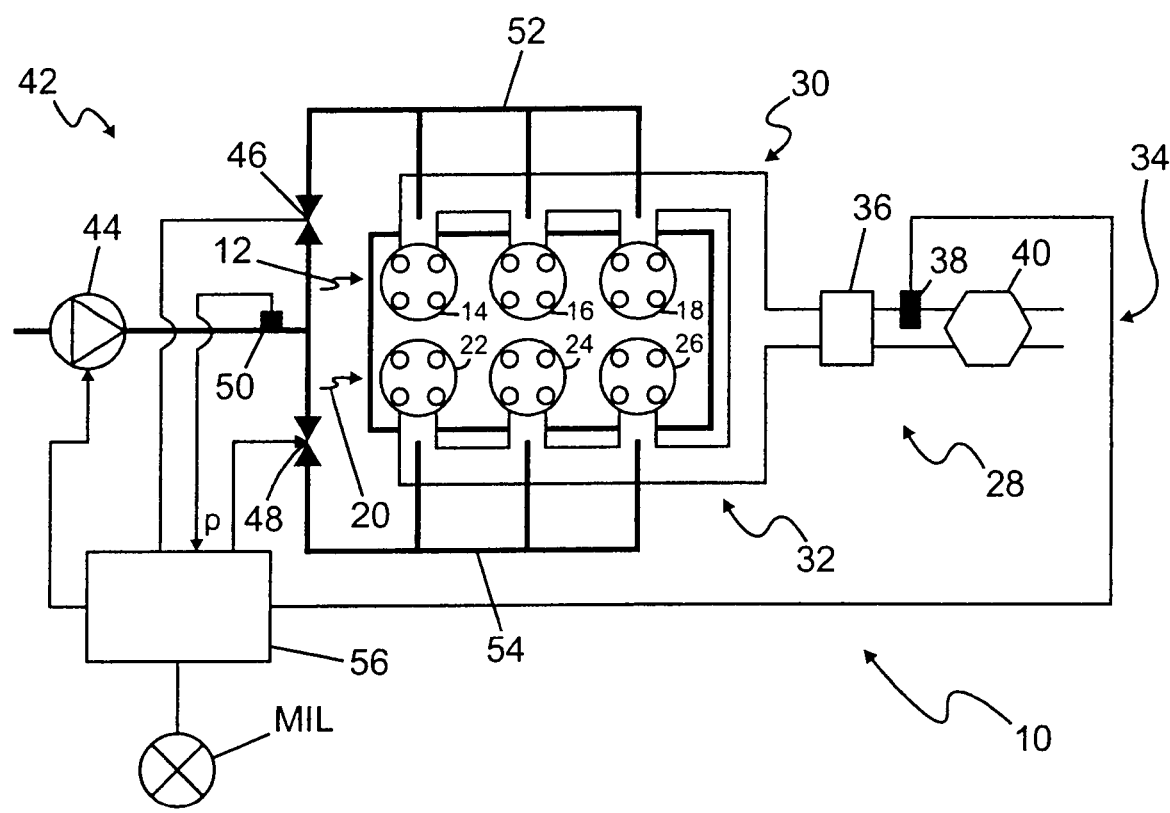
FIG. 1 an internal combustion engine with a division of a secondary air flow into two partial flows as a technical layout of the invention, and FIG. 2 a flow diagram as an example of embodiment of the procedure according to the invention.

FIG. 1 shows in detail an internal combustion engine 10 with a first group 12 of cylinders 14, 16, 18 and a second group 20 of cylinders 22, 24, 26. The first group 12 and the second group 20 concern, for example, a first and a second cylinder bank of a V-engine 10. Other formations of the groups are possible. The exhaust gases of all the cylinders 14, 16, 18, 22, 24, 26 are discharged by an exhaust gas system 28, which has a first branch 30 for the exhaust gases of the first group 12, a second branch 32 for the exhaust gases of the second group 20 and a common section 34, which discharges the exhaust gases of both of the groups 12, 20. In the embodiment of FIG. 1, the common section 34 has a turbo charger 36, a lambda sensor 38 and a catalytic converter 40; through which in this sequence, the exhaust gas of the internal combustion engine 10 flows. Other configurations are, however, also possible: for example, configurations with two turbo chargers and/or two or more catalytic converters and/or lambda sensors and/or other exhaust gas sensors, for example, hydrocarbon sensors and/or nitrogen oxide sensors.

The internal combustion engine 10 has additionally a secondary air system 42 with a secondary air pump 44, a first secondary air valve 46, a second secondary air valve 48 and a pressure sensor 50. In the depiction of FIG. 1, a secondary air flow pumped by secondary air pump 44 is apportioned to a first secondary air branch 52 and a second secondary air branch 54. In the process, the apportionment can be controlled by a corresponding actuation of the secondary air valves 46, 48. Both of the secondary air valves 46, 48 constitute for that reason individually in each case as well as together a controllable secondary air flow cross section. They are individually actuated by a control unit 56. The pressure sensor 50 measures the pressure p, which prevails in the secondary air system between the secondary air pump 44 and the secondary air valves 46, 48, and provides corresponding measurement values p, which are acquired by the control unit 56.

The control unit 56 concerns preferably an electronic control unit, which, for example, also controls the fuel metering and/or ignition of the internal combustion engine 10; and for that purpose, also processes the signal of the lambda sensor 38 and the signals of other unspecified sensors for the operational parameters of the internal combustion engine, like its rotational speed, intake air mass, coolant temperature, etc. The control unit 56 is accordingly equipped, especially programmed, to control the sequence of a procedure to check a functional capability of the secondary air system 42 of the internal combustion engine 10. It is especially equipped for the purpose of acquiring values of a pressure p provided by the pressure sensor 50. This pressure p appears in the secondary air system 42 between a secondary air pump 44 and a controllable secondary air flow cross section, when the secondary air pump 44 is activated and the actuation of the secondary air flow cross section is increased. The control unit 56 is then programmed to form a mass M(p) for the pressure p from the acquired values, to compare them with a set point value and to assess the functional capability of the secondary air system 42 as a function of a result of the comparison. At the same time the control unit 56 according to the invention actuates one of the two secondary air valves 46, 48 to close and the other secondary air valve 48, 46 to open and assesses the functional capability of the secondary air system for the secondary air valve actuated to open, respectively for the corresponding branch 52, 54. If the control unit 56 determines an error in the secondary air system 42, it activates a malfunction indicator light MIL in one embodiment.

Figure 2:
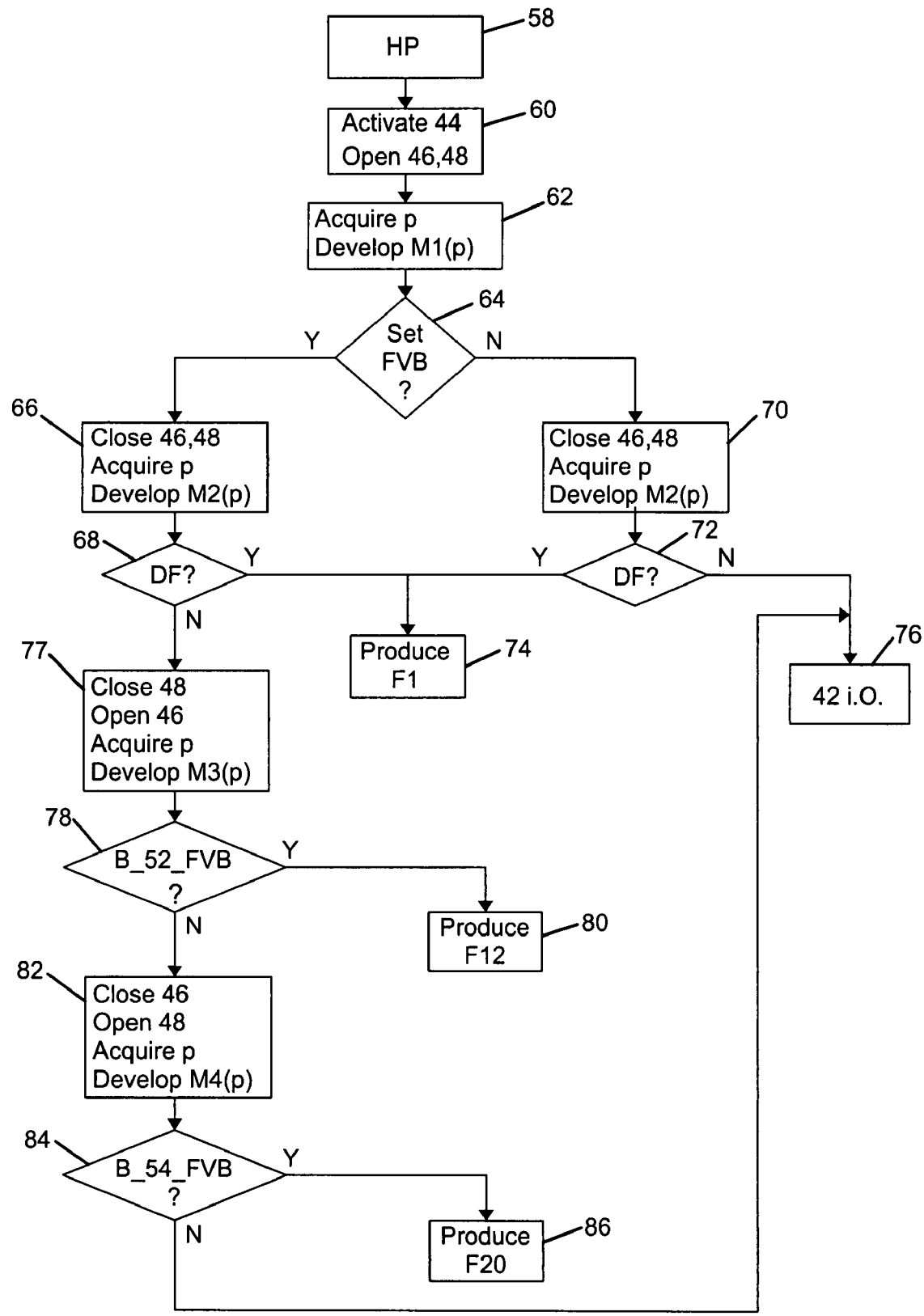

FIG. 2 shows an example of embodiment of a procedure according to the invention, whose sequence is controlled in an open loop by the control unit 56.

Step 58 corresponds thereby to a main program HP, which is executed by the control unit 56 for the open loop control of the internal combustion engine 10. When the internal combustion engine 10 is being started, a check is simultaneously made among other things if an injection of secondary air is supposed to occur. This is, for example, the case during a cold start of the internal combustion engine 10. This is in contrast not the case during normal operation of the internal combustion engine 10 when running or during a warm start of the internal combustion engine 10 with operationally warm components of the emission control system. If an injection of secondary air is supposed to occur and if at the same time the functional capability of the secondary air system 42 is additionally to be checked, the program branches into step 60, in which the secondary air pump 44 is activated and a controlled increase of the secondary air flow cross section results by the actuation of both secondary air valves 46, 48 to the open position. In the case of an electrical secondary air pump 44, the activation results, for example, by simply switching it on.

Because the actuation to the open position for both secondary air valves 46, 48 occurs with the controlled increase of the complete secondary air flow cross section, this phase of the actuation to the open position is also designated in this application as the complete system phase. It comprises in the depiction of FIG. 2 beside step 60 also the additional steps 62 and 64.

In step 62 the values of the pressure p provided by the pressure sensor 50 are acquired. This acquired pressure p appears when the secondary air pump is activated and the secondary air flow cross section is increased. Additionally a first mass M1(p) for the pressure p is formed from the acquired values. In so doing, the first mass M1(p) is preferably formed to an expected value E by an averaging (for example by a filtering with a deep pass filter) of the acquired pressure values p over a predetermined time period and by a standardization of the average value $\bar{p}$, whereby the expected value E is predetermined in the control unit 56 under the assumption of a functionally capable secondary air system as an established value or as a value dependent on other operating parameters of the internal combustion engine 10. The quotient $M1(p)=\bar{p}/E$ from the average value $\bar{p}$ of the acquired pressure values and the expected value E, that is to say the ratio between an actual value of the average pressure and the expected value E, is designated below also as the secondary air mass ratio. If the actual value and the expected value correlate, the secondary air mass ratio is equal to 1. Values, which are smaller than 1, occur if the actual value of the average pressure is comparatively small. Accordingly values occur, which are greater than 1, for comparatively large actual values of the average pressure.

Within the scope of the invention, too small values as well as too large values are evaluated as indexes for a malfunction of the secondary air system 42, whereby such a classification into too small and too large values takes place in step 62 by comparisons of the secondary air mass ratio with a lower and an upper threshold value. A secondary air mass ratio, which is too large, can, for example, result from a secondary air valve 46 and/or 48, which is malfunctioning by not opening, whereas a secondary air mass ratio, which is too small, can occur as a result of a malfunction of the secondary air pump 44. Depending on whether the secondary air mass ratio lies outside or inside of a range of excepted values, which is defined by the lower and upper threshold values, it is decided in step 64, if a presumption of error bit FVB is suppose to be set or not suppose to be set. A presumption of error bit FVB, which is set, means that the secondary air system 42 probably has an error.

By executing the steps 60 to 64, a controllable increase of the secondary air flow cross section correspondingly occurs in a complete system phase by way of an actuation to the open position of both secondary air valves 46, 48, an acquisition of values of the pressure p which thereby arise, a development of the first mass $M1(p)$ as a function of the acquired values and by way of an assessment as "presumably malfunctioning" as a function of the first mass $M1(p)$ for the pressure p. In so doing, the secondary air system 42 is assessed to be "presumably malfunctioning", if the first mass does not lie in the range of the excepted values and, therefore, does not fulfill a first specified condition.

Additional steps, which are explained below, serve to refute or acknowledge the presumption and, if need be, serve to localize the malfunction.

In a configuration a leakage test phase is attached to step 64. This phase is represented in FIG. 2 as well as by the steps 66, 68 and also as well by the steps 70, 72, which alternatively cycle. In step 66 both secondary air valves 46, 48 are actuated to close when the secondary air pump 44 continues to be activated or is activated anew. Entirely analogous to the action in the complete system phase, an additional secondary air mass ratio $M2(p)$ is developed in the process and compared with a likewise adapted threshold value using a predetermined expectation value, which takes into account the altered actuation of the secondary air valves 46, 48. A comparatively small secondary air mass ratio $M2(p)$ results at a comparatively small pressure, as it appears in the case of a leakage or a malfunctioning secondary air valve 46 and/or 48, which is not closing. Step 66 makes possible for that reason the establishment of an impermeability error DF by means of a comparison of the secondary air mass ratio $M2(p)$ with a threshold value, which designates a minimum secondary air mass ratio $M2(p)$ when the secondary air system 42 is in good working order.

If an impermeability error DF is established in step 66, the subsequent query step 68 branches to a step 74, in which an error message F1 is produced and/or for statistical security is stored in memory or displayed.

The steps 70 and 72 are cycled alternatively to the steps 66 and 68. In steps 70 and 72, the same steps are implemented as they have been described in connection with steps 66 and 68. In this respect the sequence of steps 70 and 72 do not differ from the sequence of steps 66 and 68. It is particularly the case that steps 70 and 72 recognize the same impermeability error as steps 66 and 68 and therefore branch likewise to step 74. A difference between the sequence of steps 66 and 68 and the sequence of steps 70 and 72 thus results on the other hand, if the query in step 68 or step 72 is answered in the negative. The step sequence 70, 72 is cycled when there is no presumption of error, which is set, (FVB in step 64 answered in the negative (n)). If then in step 72 an impermeability error DF is also answered in the negative, the program branches out to a step 76, in which the secondary air system 42 is assessed altogether to be in good working order (in order, i.O).

In other words: by means of this configuration, values of a pressure p are acquired additionally in a leakage test phase when the secondary air pump 44 is activated and the secondary air flow cross section is actuated to close. A second measurement $M2(p)$ for the pressure is developed as a function of the acquired values, and the assessment occurs as a function of the second measurement $M2(p)$ for the pressure (p). In so doing, both of the separate sections 52 and 54 of the secondary air system 42 and with them especially both secondary air valves 46, 48 are assessed to be impermeable, if the second measurement $M2(p)$ developed as a secondary air mass ratio does not fulfill a second predetermined condition for the pressure p, i.e. to be greater than a threshold value, which designates a minimum secondary air mass ratio in the case that the secondary air system 42 is in good working order.

Alternatively to this kind of leakage test, a check can also be made in the one leakage test phase, if when the secondary air valves 46, 48 are actuated to close and the secondary air pump 44 is deactivated, pulsations of the pressure occur, which prevails in the secondary air system 42 between the secondary air pump 44 and the secondary air valves 46. Such pulsations occur in the exhaust gas on account of the periodic opening and closing of the exhaust valves of the cylinders. An occurrence of pulsations in the secondary air system 42 indicates for that reason an open connection between the secondary air system 42 and the exhaust gas system 34. This alternative has the advantage of avoiding a noise stress, which occurs when the secondary air pump 44 is activated and the secondary air valves 46, 48 are closed.

If, on the other hand, the impermeability error is answered in the negative when cycling through the steps 64, 66, the secondary air system 42 is in contrast assessed to still not be error free. The reason for this lies with the fact that the presumption of error in steps 62, 64 can also in the case of other errors be attributed to a leakage. The establishment of impermeability does not suffice for that reason to disprove the presumption of error, which has been set. For that reason, additional steps join the negation n of the query in step 68 to provide a detailed assessment. With these additional steps, the presumption of error, which has been set, is either disapproved or acknowledged with an exact localization of an error.

For this purpose, one of the two secondary air valves 44, 46 is initially actuated in a step 77 to close, while the other of the two secondary air valves 44, 46 is actuated to open. Additionally an assessment of the functional capability of the secondary air system 42 subsequently takes place for a section 52, 54 of the secondary air system 42, in which the secondary air valve 46, 48 actuated to open is disposed.

The steps 77 and 78 in FIG. 2 represent a first partial system phase, in which the actuation of one the two secondary air valves 46 to close results during the opening actuation of the other of the two secondary air valves 46, 48 in a first partial system phase. It is assumed below without loss of generality that in the first partial system phase, the secondary air valve 46 is opened, and the secondary air valve 48 is closed. Values of the pressure p are subsequently acquired again. The pressure p here refers to that pressure which arises in the secondary air system 42 between the secondary air pump 44 and the secondary air flow cross section, which can be controlled; hence, between the two secondary air valves 46 and 48 during activation of the secondary air pump 44. A third measurement M3(p) for the pressure p is formed as a function of the acquired values, and the assessment occurs as a function of the third measurement M3(p). The third measurement M3(p) for the pressure p is likewise preferably developed as a secondary air mass flow, just as it was described previously in connection with the development of the first measurement M1(p).

Within the scope of the invention, too small as well as too large values of the third measurement M3(p) are assessed as evidence for a malfunction of the secondary air system 42 and thereby as acknowledgement of the presumption FVB set previously. In so doing, such a classification results in step 77 in too small and too large values by means of comparisons of the secondary air mass ratio M3(p) with a lower and upper threshold value predetermined in each case. A secondary air mass ratio M3(p) which is too large acknowledges, for example, a presumption of error, which has been set on account of too large a secondary air mass ratio M3(p) and allows furthermore for a localization of the cause. In the example presented, the section 52 associated with the first secondary air valve 46 has too great of a resistance, which can be caused, for example, by a line blockage or by a malfunctioning first secondary air valve 46 not opening wide enough. As a consequence thereof, a bit B_52_FVB is set in step 77. In step 78, query is made if this bit B_52_FVB was set, and when the query is affirmed, a specified error message F12 for the affected cylinder group 12 is produced and/or stored as memory and/or displayed.

If on the other hand no bit B_52_FVB is produced, because the section does not have an error, a second partial system phase attaches itself to the steps 82, 84, 86. These steps 82, 84, 86 correspond to the steps 76, 78, 80 with the difference that the second secondary air valve 48 is actuated to open in the second partial system phase, while the first secondary air valve 46 is actuated to close. If the presumption of error FVB previously set is acknowledged in the second partial system phase, in which accordingly a fourth measurement M4(p) is developed for the pressure p, the error can be assigned to the associated section 54, in which a bit B_54_FVB is set. If this is the case, the step 84 branches to the step 86, in which an error message F20 for the affected cylinder group 20 is produced and/or stored as memory and/or displayed. This corresponds to an acknowledgement of the presumption of error FVB. If the presumption of error FVB on the other hand is disproved by answering the query 84 in the negative (n), the program branches into step 76, in which the secondary air system 42 is assessed to be in working order.

It goes without saying that the different phases cannot only be processed in the described sequence but also in a different sequence. Thus, especially the sequence of the leakage test and of the two partial system tests can be exchanged. That is then especially expedient, if that alternative of the leakage tests is used during a test in which pulsations occur.

So far as has been described up until now, step 76, in which the secondary air system is assessed to be in order, can be reached from step 72 or step 84. If step 76 is reached by way of Step 72, the partial system phases are no longer cycled. For an improved reliability of the diagnosis, provision is made in an additional embodiment for all phases to be cycled and for the assessment to occur after all phases have been cycled while taking into account the results of the individual phases, in other words after the cycling of the complete system phase, of both partial system phases and the leakage test phase. In so doing, the possible results are preferably combined with each other by AND operations. This preferably takes place in such a manner that F12 is produced by the bit B_52_FVB when the presumption of error FVB is set and an impermeability error DF does not exist and acknowledgement of the presumption of error FVB occurs; that F20 is produced by the bit B_54_FVB when the presumption of error FVB is set and an impermeability error DF does not exist and acknowledgement of the presumption of error FVB occurs; and the result "in order" of step 76 is only achieved if the bits B_52_FVB and B_54_FVB have not been set. The imprecise error message F1 by way of comparison is preferred within the scope of this alternative and only then produced, if a presumption of error FVB, which was set, was not acknowledged by means of the setting of one of the bits B_52_FVB and B_54_FVB and an impermeability error DF was determined. In contrast to the embodiment of FIG. 2, F1 can also only then be set after both partial system phases have been cycled.

The invention claimed is:

1. A method of testing a functional capability of a secondary air system of an internal combustion engine, the method comprising:
    acquiring values of a pressure, which arise in the secondary air system between a secondary air pump and a secondary air flow section and which are controlled when the secondary air pump is activated and the secondary air flow section is actuated;
    developing a measurement for the pressure from the acquired values;
    comparing the measurement with a set point value; and
    assessing the functional capability of the secondary air system as a function of a result of the comparison;
    wherein in the secondary air system, the secondary air flow section are controlled by two secondary air valves, one of the two secondary air valves being actuated to close, while the other of the two secondary air valves is actuated to open, and the assessment of the functional capability for one of first and second secondary air branches of the secondary air system occurs in the one of the first and second secondary air branches, in which the secondary air valve actuated to open is disposed.

2. A method according to claim 1, further comprising checking in a leakage test phase if pulsations in the pressure prevailing between the secondary air pump and the secondary air valves emerge when the secondary air valves are actuated to close and the secondary air pump is deactivated.

3. A method according to claim 1, wherein developing includes in each case a filtering of the acquired pressure values.

4. A method according to claim 1, further comprising in a leakage test phase, acquiring additional values of a pressure, which arises in the secondary air system between the secondary air pump and the secondary air valves when the secondary air pump is activated and the secondary air flow section is actuated to close; in that values of the pressure arising as a result of the above action are acquired; in that a second measurement for the pressure is developed and the assessment occurs as a function of the second measurement for the pressure.

5. A method according to claim 4, wherein both secondary air valves are assessed as leak proof, if the second measurement for the pressure does not fulfill a second predetermined condition.

6. A method according to claim 1, wherein a controlled increase in the actuation of one of the two secondary air valves occurs in a complete system phase by way of actuating both of the secondary air valves to open; in that values of the pressure arising as a result of this increase are acquired; in that a first measurement for the pressure is developed as a function of the acquired values and the assessment occurs as a function of the first measurement for the pressure.

7. A method according to claim 6, wherein the secondary air system is assessed as presumed to be malfunctioning, if a first measurement does not fulfill a first predetermined condition.

8. A method according to claim 7, wherein the actuation of one of the two secondary air valves to close, when the other one of the two secondary air valves is being actuated to open, occurs in a first partial system phase; in that values of a pressure are acquired, which arises in the secondary air system between the secondary air pump and the secondary air flow section, which are controlled, in the first partial system phase when the secondary air pump is activated; in that a third measurement for the pressure is developed as a function of the acquired values and the assessment occurs as a function of the third measurement for the pressure.

9. A method according to claim 8, wherein the actuation of one of the two secondary air valves to close occurs in a second partial system phase, when the other one of the two secondary air valves is activated to open; in that values of a pressure are acquired, which arises in the secondary air system between the secondary air pump and the secondary air flow section, which are controlled, in the second partial system phase when the secondary air pump is activated; in that a fourth measurement for the pressure is developed and the assessment occurs as a function of the fourth measurement for the pressure.

10. A control unit of an internal combustion engine, wherein the control unit is configured to:
    control a sequence of a procedure to test a functional capability of a secondary air system of the internal combustion engine;
    acquire values of a pressure, which arise in a secondary air system between a secondary air pump and a secondary air flow section, which are controlled, when the secondary air pump is activated and the actuation secondary air flow section is increased;
    develop a measurement for the pressure from the acquired values;
    compare the measurement with a set point value; and
    assess the functional capability of the secondary air system as a function of a result of the comparison, wherein the secondary air flow section are controlled by two secondary air valves, wherein one of the two secondary air valves is actuated to close and the other one of the two secondary air valves is actuated to open, and the functional capability of the secondary air system for one of first and second secondary air branches of the secondary air system is assessed in the one of the first and second secondary air branches, in which the secondary air valve actuated to open is disposed.

* * * * *